US012571973B2

(12) United States Patent
Patel et al.

(10) Patent No.: US 12,571,973 B2
(45) Date of Patent: Mar. 10, 2026

(54) ELECTRO-OPTICAL CIRCUIT

(71) Applicant: Cisco Technology, Inc., San Jose, CA (US)

(72) Inventors: Vipulkumar K. Patel, Breinigsville, PA (US); Sandeep Razdan, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 18/347,452

(22) Filed: Jul. 5, 2023

(65) Prior Publication Data

US 2025/0012988 A1     Jan. 9, 2025

(51) Int. Cl.
  *G02B 6/42*          (2006.01)
(52) U.S. Cl.
  CPC ......... *G02B 6/4283* (2013.01); *G02B 6/4213* (2013.01); *G02B 6/4214* (2013.01); *G02B 6/4269* (2013.01)
(58) Field of Classification Search
  CPC ... G02B 6/4283; G02B 6/4213; G02B 6/4269
  See application file for complete search history.

(56) References Cited

U.S. PATENT DOCUMENTS

| | | | |
|---|---|---|---|
| 11,841,541 B2 * | 12/2023 | Chang | ................. H01L 23/5383 |
| 2020/0013699 A1 | 1/2020 | Liu et al. | |

| | | | |
|---|---|---|---|
| 2021/0028534 A1 | 1/2021 | Liu et al. | |
| 2021/0280568 A1 | 9/2021 | Traverso et al. | |
| 2022/0342150 A1 * | 10/2022 | Karhade | ............ G02B 6/12002 |
| 2022/0365274 A1 | 11/2022 | Huang et al. | |
| 2023/0012157 A1 | 1/2023 | Yu et al. | |
| 2023/0060862 A1 * | 3/2023 | Patel | ..................... G02B 6/423 |
| 2023/0088009 A1 | 3/2023 | Karhade et al. | |

OTHER PUBLICATIONS

Adil Masood, "3D Integration of Photonics & CMOS using Cu Through-Silicon-Via," Ghen University: Photonics Research Group: Research Topics, Date Accessed: Jun. 29, 2023, pp. 1-2.

* cited by examiner

*Primary Examiner* — Sung H Pak

(74) *Attorney, Agent, or Firm* — Patterson + Sheridan, LLP

(57) ABSTRACT

The present disclosure relates to an opto-electrical circuit and a method of forming an opto-electrical circuit. According to an embodiment, a circuit includes a photonic integrated circuit, an intermetal dielectric, an oxide layer, and a first electronic integrated circuit. The intermetal dielectric is coupled to the photonic integrated circuit. The oxide layer is coupled to the intermetal dielectric such that the intermetal dielectric is positioned between the photonic integrated circuit and the oxide layer. The first electronic integrated circuit is positioned within the oxide layer and coupled to the intermetal dielectric. A through oxide via extends through the oxide layer to the intermetal dielectric.

20 Claims, 12 Drawing Sheets

100

ELECTRO-OPTICAL CIRCUIT

TECHNICAL FIELD

Embodiments presented in this disclosure generally relate to electro-optical circuits. More specifically, embodiments disclosed herein relate to an electro-optical circuit with an electronic integrated circuit positioned in an oxide layer.

BACKGROUND

In optical networks, optical circuits are used to convert optical signals into electrical signals for electrical circuits. To accommodate increasing network speeds, optical circuits were brought closer to electrical circuits and eventually, optical circuits were packaged with electrical circuits.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
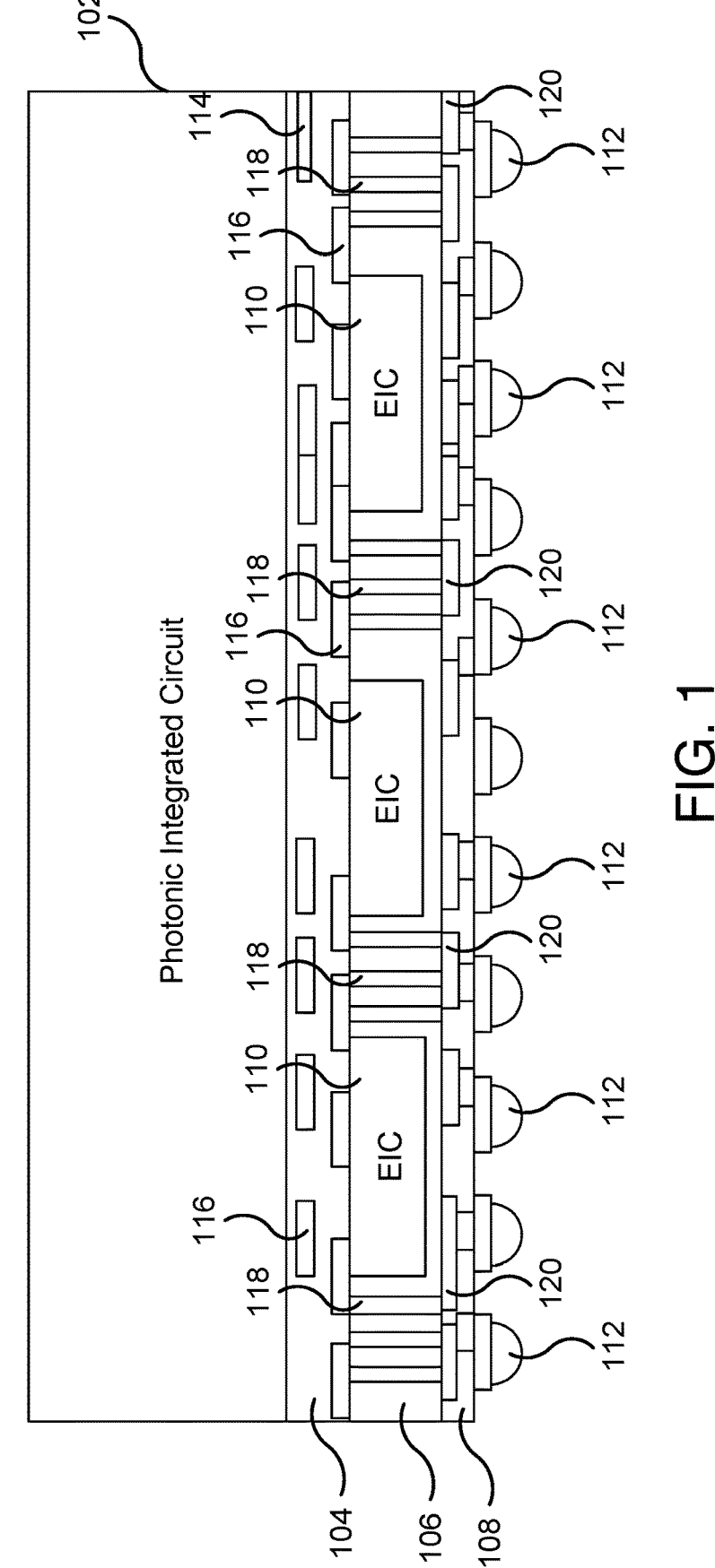
FIG. 1 illustrates an example circuit.

The present disclosure relates to an opto-electrical circuit and a method of forming an opto-electrical circuit. According to an embodiment, a circuit includes a photonic integrated circuit, an intermetal dielectric, an oxide layer, and a first electronic integrated circuit. The intermetal dielectric is coupled to the photonic integrated circuit. The oxide layer is coupled to the intermetal dielectric such that the intermetal dielectric is positioned between the photonic integrated circuit and the oxide layer. The first electronic integrated circuit is positioned within the oxide layer and coupled to the intermetal dielectric. A through oxide via extends through the oxide layer to the intermetal dielectric.

According to another embodiment, a method of forming a circuit includes attaching an intermetal dielectric to a photonic integrated circuit and attaching a first electronic integrated circuit to the intermetal dielectric. The method also includes forming an oxide layer on the intermetal dielectric such that the first electronic integrated circuit is positioned in the oxide layer and such that the intermetal dielectric is positioned between the photonic integrated circuit and the oxide layer and forming a through oxide via through the oxide layer to the intermetal dielectric.

According to another embodiment, a system includes a substrate, a circuit, and a heatsink. The circuit is coupled to the substrate and includes a photonic integrated circuit, an intermetal dielectric, an oxide layer, and an electronic integrated circuit. The intermetal dielectric is coupled to the photonic integrated circuit. The oxide layer is coupled to the intermetal dielectric such that the intermetal dielectric is positioned between the photonic integrated circuit and the oxide layer and such that the oxide layer is positioned between the substrate and the intermetal dielectric. The electronic integrated circuit is positioned within the oxide layer and coupled to the intermetal dielectric. A through oxide via extends through the oxide layer to the intermetal dielectric. The heatsink is coupled to the substrate. The heatsink extends over the circuit such that the circuit is positioned between the substrate and the heatsink.

EXAMPLE EMBODIMENTS

To accommodate increasing network speeds, optical circuits and electrical circuits may be packaged together to reduce the distance between the optical circuits and the electrical circuits. Adding more components to the same package may increase the size of the package, which may increase the risk of warpage caused by mechanical stresses (e.g., strain and shear) on the package. The warpage may degrade device performance and reliability. Additionally, to maintain operational temperatures, the package may need to dissipate more heat produced by the additional components in the package.

The present disclosure describes a circuit that includes a photonic integrated circuit and an electronic integrated circuit. An intermetal dielectric is attached to the photonic integrated circuit and the electronic integrated circuit. The intermetal dielectric is positioned between the photonic integrated circuit and the electronic integrated circuit, and the intermetal dielectric includes metal layers that electrically connect the photonic integrated circuit to the electronic integrated circuit. Additionally, the electronic integrated circuit is positioned in (e.g., embedded in) an oxide layer attached to the intermetal dielectric. Through oxide vias are formed through the oxide layer. The through oxide vias connect to some of the metal layers in the intermetal dielectric, and these metal layers electrically connect to the electronic integrated circuit.

In certain embodiments, the circuit provides several technical advantages. For example, stacking the photonic integrated circuit on the intermetal dielectric, oxide layer, and electronic integrated circuits improves resistance against warpage. As another example, positioning the electronic integrated circuit in an oxide layer improves the thermal conduction in the circuit relative to existing circuits in which the electronic integrated circuits were positioned in (e.g., embedded in) a molding compound or in a fanout wafer or package.

FIG. 1 illustrates an example circuit 100. Generally, the circuit 100 may be an electro-optical circuit. As seen in FIG. 1, the circuit 100 includes a photonic integrated circuit 102, an intermetal dielectric 104, an oxide layer 106, a redistribution layer 108, one or more electronic integrated circuits 110, solder balls 112, an optical component 114, metal layers 116, through oxide vias 118, and metal layers 120.

The photonic integrated circuit 102 is an optical circuit that converts optical signals into electrical signals, and vice versa. Generally, optical signals may enter or exit the photonic integrated circuit 102 through the optical component 114. For example, a waveguide or fiber array unit may be optically coupled to the optical component 114. Optical signals may then travel through the waveguide or fiber array unit into the optical component 114, or the optical signals may travel through the optical component 114 and into the waveguide or fiber array unit. Optical signals may enter the photonic integrated circuit 102. The photonic integrated circuit 102 may convert the optical signals into electrical signals and communicate the electrical signals to other components in the circuit 100 (e.g., to an electronic integrated circuit 110). Electrical signals may enter the photonic integrated circuit 102, and the photonic integrated circuit may convert those electrical signals into optical signals. The photonic integrated circuit 102 may then communicate these optical signals through the optical component 114 and into a waveguide or fiber array unit. In some embodiments, the photonic integrated circuit 102 has a thickness that makes it easier to optically couple a waveguide, fiber, or fiber array unit to the optical component 114.

The intermetal dielectric 104 is attached to the photonic integrated circuit 102. The intermetal dielectric 104 may be an insulator that electrically insulates the components within the intermetal dielectric 104 from each other. In some embodiments, the intermetal dielectric 104 may be part of the photonic integrated circuit 102. For example, the intermetal dielectric 104 may be a layer of the photonic integrated circuit 102. As seen in FIG. 1, the optical component 114 and the metal layers 116 may be positioned in the intermetal dielectric 104. As discussed above, the optical component 114 may carry optical signals to or from the photonic integrated circuit 102, where the optical signals are converted to electrical signals. The optical component 114 may be any component that carries optical signals. In the example of FIG. 1, the optical component 114 may be an optical mode converter positioned at an edge of the intermetal dielectric 104 so that the optical mode converter provides edge coupling of optical signals. A waveguide, fiber, or fiber array unit may edge couple to the optical component 114 to send optical signals to the optical component 114 or to receive optical signals from the optical component 114.

The metal layers 116 in the intermetal dielectric 104 may electrically connect the photonic integrated circuit 102 to other components. For example, the metal layers 116 in the intermetal dielectric 104 may electrically connect the photonic integrated circuit 102 to the electronic integrated circuits 110. After the photonic integrated circuit 102 converts an optical signal from the optical component 114 into an electrical signal, the metal layers 116 may carry the electrical signal from the photonic integrated circuit 102 to an electronic integrated circuit 110.

The oxide layer 106 is attached to the intermetal dielectric 104. Specifically, the oxide layer 106 is attached to a side of the intermetal dielectric 104 that is opposite the side of the intermetal dielectric 104 attached to the photonic integrated circuit 102. As a result, the intermetal dielectric 104 is positioned between the photonic integrated circuit 102 and the oxide layer 106. The oxide layer 106 may be an insulator that electrically insulates the components within the oxide layer 106 from each other.

As seen in FIG. 1, one or more electronic integrated circuits 110 are positioned in the oxide layer 106. Additionally, the electronic integrated circuits 110 are also positioned on the intermetal dielectric 104. For example, the electronic integrated circuits 110 may first be attached to the intermetal dielectric 104 such that the metal layers 116 in the intermetal dielectric 104 electrically couple to the electronic integrated circuits 110. The metal layers 116 may then carry electrical signals from the photonic integrated circuit 102 to the electronic integrated circuits 110. After the electronic integrated circuits 110 are positioned on the intermetal dielectric 104, oxide may be deposited or filled around the electronic integrated circuits 110 to form the oxide layer 106. As a result, the electronic integrated circuits 110 are positioned on the intermetal dielectric 104 and within the oxide layer 106. In certain embodiments, the oxide layer 106 provides improved thermal conduction relative to existing circuits in which the electronic integrated circuits 110 are positioned within a molding compound or in a fanout wafer or package. Thus, the circuit 100 can dissipate power more efficiently than existing circuits, which allows the circuit 100 more easily maintain operating temperatures within a desired range.

An electronic integrated circuit 110 in the oxide layer 106 processes or handles electrical signals from the photonic integrated circuit 102. For example, the photonic integrated circuit 102 may convert an optical signal from the optical component 114 into an electrical signal. The photonic integrated circuit 102 may then communicate the electrical signal to the electronic integrated circuit 110 through the metal layers 116 in the intermetal dielectric 104. The electronic integrated circuit 110 may then process or handle the electrical signal.

Through oxide vias 118 are positioned in the oxide layer 106. In some embodiments, the through oxide vias 118 are formed in the oxide layer 106 after oxide is deposited or filled around the electronic integrated circuits 110 to form the oxide layer 106. The through oxide vias 118 may electrically connect to some of the metal layers 116 in the intermetal dielectric 104. These metal layers 116 may electrically connect to the electronic integrated circuits 110 in the oxide layer 106. As seen in FIG. 1, the through oxide vias 118 may be positioned or formed in the oxide layer 106 between the electronic integrated circuits 110 in the oxide layer 106.

The redistribution layer 108 may be attached to the oxide layer 106. As seen in FIG. 1, the redistribution layer 108 it attached to a side of the oxide layer 106 that is opposite the side of the oxide layer 106 attached to the intermetal dielectric 104. Thus, the oxide layer 106 is positioned between the intermetal dielectric 104 and the redistribution layer 108. The redistribution layer 108 may be an insulator that electrically insulates the components within the redistribution layer 108 from each other.

As seen in FIG. 1, the metal layers 120 are positioned within the redistribution layer 108. Some of the metal layers 120 may electrically connect to the through oxide vias 118 in the oxide layer 106. The metal layers 120 may also electrically connect to pads or the solder balls 112 positioned on the side of the redistribution layer 108 opposite the side of the redistribution layer 108 attached to the oxide layer 106. Thus, the metal layers 120 may carry electrical signals from the through oxide vias 118 through the redistribution layer 108 and to the solder balls 112.

In an example operation, the optical component 114 carries an optical signal through the intermetal dielectric 104 and into the photonic integrated circuit 102. The photonic integrated circuit 102 converts the optical signal into an electrical signal and communicates the electrical signal to the metal layers 116 in the intermetal dielectric 104. The metal layers 116 carry the electrical signal through the intermetal dielectric 104 and to an electronic integrated circuit 110 in the oxide layer 106. The electronic integrated circuit 110 processes or handles the electrical signal. Additionally, the electronic integrated circuit 110 may communicate an electrical signal to a metal layer 116 in the intermetal dielectric 104. That metal layer 116 may carry the electrical signal to a through oxide via 118 in the oxide layer 106. The through oxide via 118 may carry the electrical signal to the metal layers 120 in the redistribution layer 108. The metal layers 120 may carry the electrical signal to the solder balls 112 and out of the circuit 100. Moreover, an electrical signal may be received at the solder balls 112. The solder balls 112 may carry the electrical signal to the metal layers 120 in the redistribution layer 108. The metal layers 120 may carry the electrical signal to a through oxide via 118 in the oxide layer 106. The through oxide via 118 may carry the electrical signal to a metal layer 116 in the intermetal dielectric 104. The metal layer 116 may carry the electrical signal to an electronic integrated circuit 110, which handles or processes the electrical signal. The electronic integrated circuit 110 may communicate an electrical signal to the metal layer 116. The metal layer 116 may carry the electrical signal to the photonic integrated circuit 102. The photonic integrated circuit 102 may convert the electrical signal into an optical signal. The photonic integrated circuit 102 may then communicate the optical signal away from the circuit 100 through the optical component 114.

In certain embodiments, the structure of the circuit 100 improves mechanical stability and reduces the risk of warpage. For example, stacking the photonic integrated circuit 102 on the intermetal dielectric 104, oxide layer 106, and electronic integrated circuits 110 improves resistance against warpage. Additionally, circuit 100 may support the full thickness of the photonic integrated circuit 102, which further reduces the risk of warpage.

For clarity, not all of the metal layers 116, through oxide vias 118, metal layers 120, and solder balls 112 have been labeled in FIG. 1 (and in subsequent figures).

Figure 2:
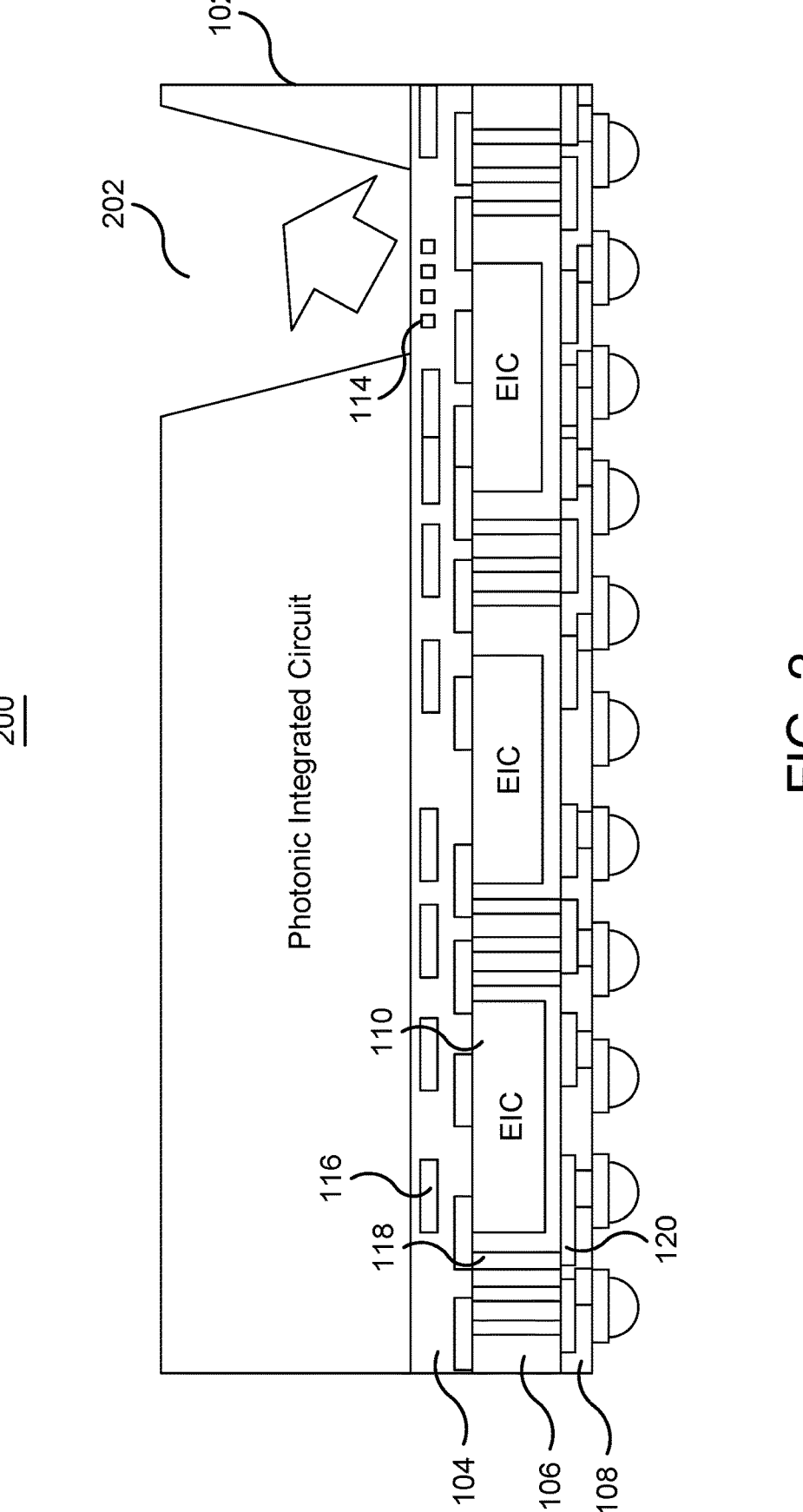
FIG. 2 illustrates an example circuit.

FIG. 2 illustrates an example circuit 200. Like the circuit 100, the circuit 200 includes the photonic integrated circuit 102, the intermetal dielectric 104, the oxide layer 106, and the redistribution layer 108. The electronic integrated circuits 110 are positioned or embedded in the oxide layer 106, and the through oxide vias 118 are positioned in the oxide layer 106 and carry electrical signals between the metal layers 116 and 120.

A difference between the circuit 200 and the circuit 100 is that the photonic integrated circuit 102 defines a cavity 202 that extends through the photonic integrated circuit 102 (e.g., from a top surface of the photonic integrated circuit 102 down to the intermetal dielectric 104). The optical component 114 is positioned within the intermetal dielectric 104 and receives optical signals through the cavity 202. For example, the optical component 114 may be a grating coupler positioned in the intermetal dielectric 104 beneath the cavity 202. Optical signals traveling through the cavity 202 may optically couple into the grating coupler. The grating coupler may then direct the optical signals into the photonic integrated circuit 102. The photonic integrated circuit 102 may convert the optical signals into electrical signals and communicate the electrical signals to the electronic integrated circuits 110 through the metal layers 116 in the intermetal dielectric 104.

Figure 3:
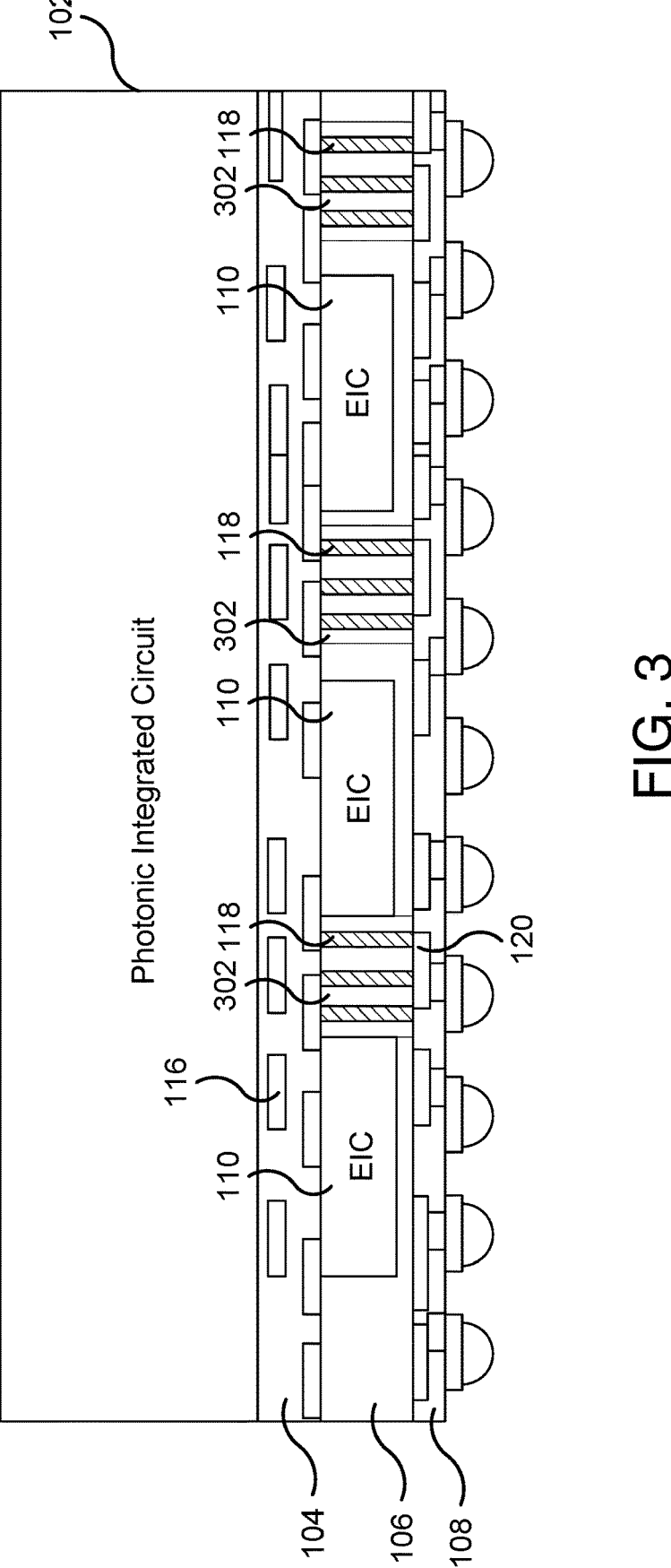
FIG. 3 illustrates an example circuit.

FIG. 3 illustrates an example circuit 300. Like the circuit 100, the circuit 300 includes the photonic integrated circuit 102, the intermetal dielectric 104, the oxide layer 106, and the redistribution layer 108. The electronic integrated circuits 110 are positioned or embedded in the oxide layer 106. Unlike the circuit 100, the through oxide vias 118 in the circuit 300 are positioned within interposers 302. For example, before oxide is deposited or filled to form the oxide layer 106, interposer dies containing the vias 118 may be positioned on or attached to the intermetal dielectric 104 next to or between electronic integrated circuits 110. The oxide may then be deposited or filled to form the oxide layer 106. In this manner, the through oxide vias 118 are present when the oxide layer 106 is formed.

Figure 4:
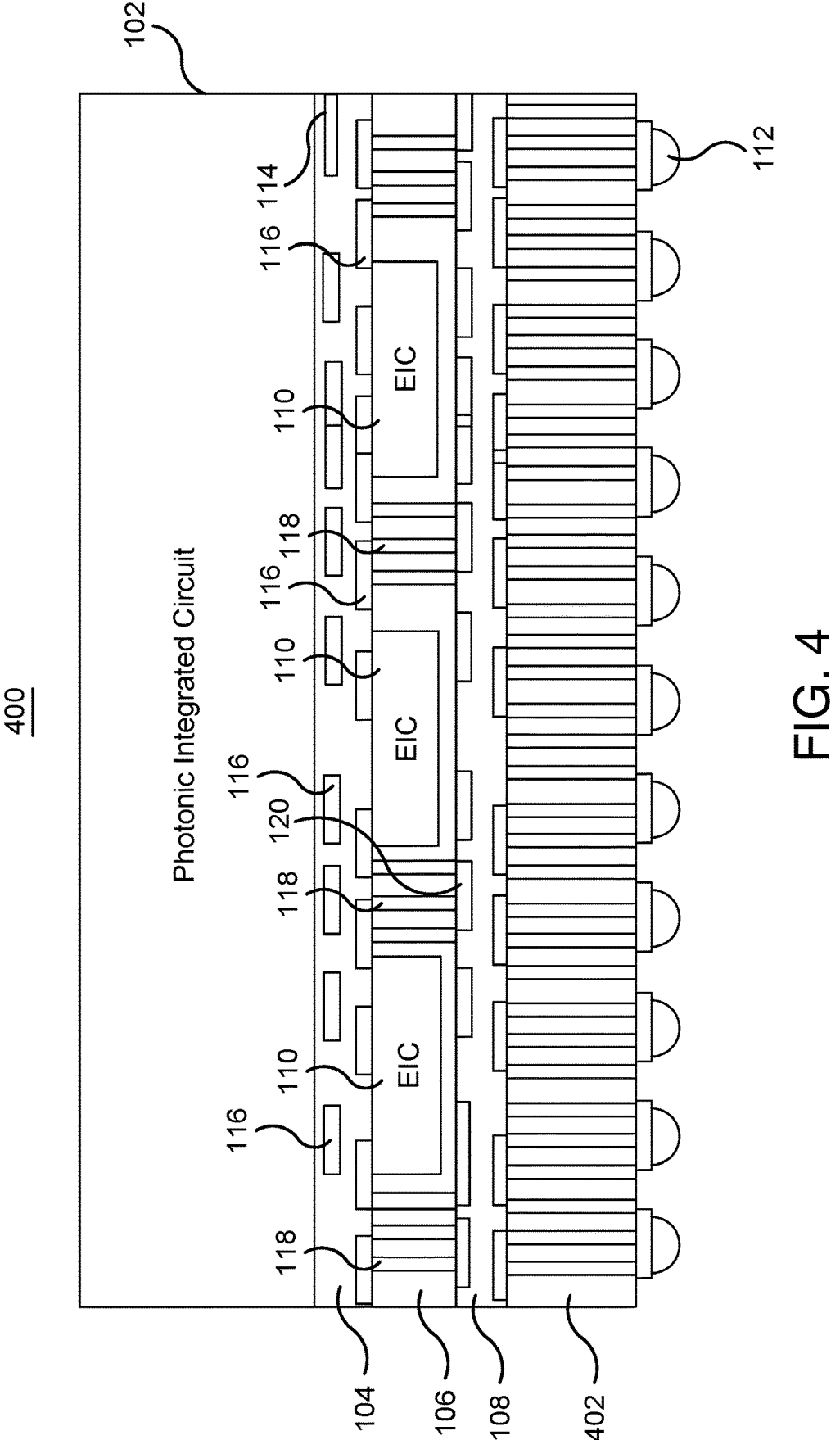
FIG. 4 illustrates an example circuit.

FIG. 4 illustrates an example circuit 400. Like the circuit 100, the circuit 400 includes the photonic integrated circuit 102, the intermetal dielectric 104, the oxide layer 106, and the redistribution layer 108. The electronic integrated circuits 110 are positioned or embedded in the oxide layer 106, and the through oxide vias 118 are positioned in the oxide layer 106 and carry electrical signals between the metal layers 116 and 120. Unlike the circuit 100, the circuit 400 includes an interposer 402 positioned between the redistribution layer 108 and the solder balls 112. The interposer 402 may be attached to the redistribution layer 108 and then the pads and solder balls 112 may be formed on the interposer 402. In certain embodiments, the interposer 402 may increase the thickness or height of the circuit 400 relative to the circuit 100 to provide additional vertical clearance between the optical component 114 and a substrate on which the circuit 400 is mounted. The additional clearance may make it easier to edge couple to the optical component 114.

As seen in FIG. 4, the interposer 402 includes vias that connect the solder balls 112 to the metal layer 120 in the redistribution layer 108. These vias may carry electrical signals between the metal layers 120 and the solder balls 112. Thus, the interposer 402 increases the thickness or height of the circuit 400 while maintaining the electrical connections within the circuit 400.

Figure 5:
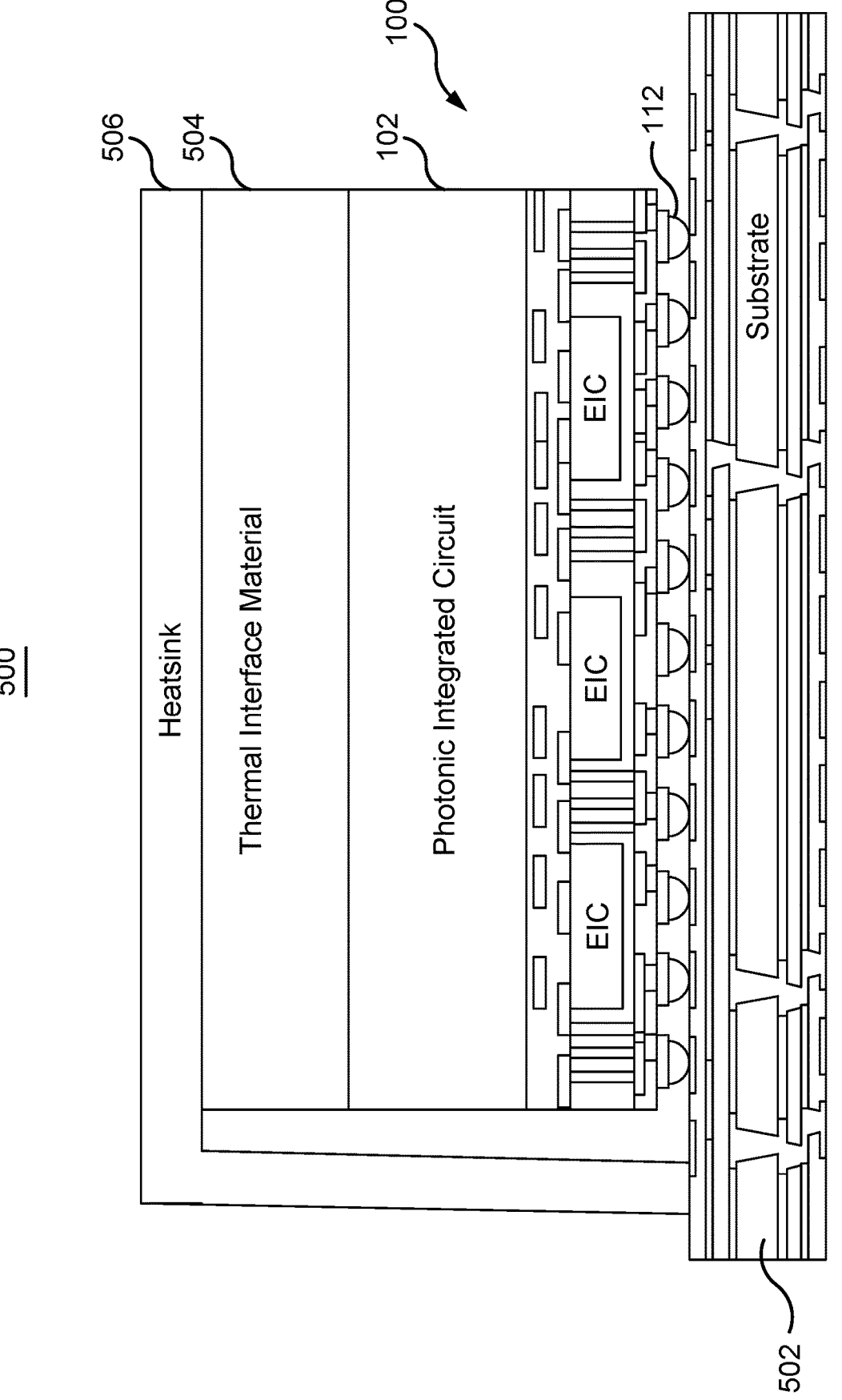
FIG. 5 illustrates an example circuit.

FIG. 5 illustrates an example circuit 500. Generally, the circuit 500 includes the circuit 100 (or any of the circuits 200, 300, or 400) mounted on a substrate 502. For example, the solder balls 112 of the circuit 100 may be used to electrically and physically attach the circuit 100 to the substrate 502. Electrical signals may be sent between the substrate 502 and the circuit 100 through the solder balls 112.

Additionally, the circuit 500 includes a thermal interface material 504 on the photonic integrated circuit 102. The thermal interface material 504 may be a thermally conductive material (e.g., a thermally conductive adhesive or gel) that conducts heat from the photonic integrated circuit 102. As a result, the thermal interface material 504 may carry heat from the photonic integrated circuit 102 away from the photonic integrated circuit 102.

The circuit 500 includes a heatsink 506 coupled to the substrate 502. A portion of the heatsink 506 may extend upwards from the substrate 502 and along a side surface of the circuit 100. The heatsink 506 may extend above the thermal interface material 504. A portion of the heatsink 506 may extend across the thermal interface material 504 and may contact the thermal interface material 504. The heatsink 506 may be made of any thermally conductive material (e.g., metal), and the heatsink 506 may carry heat from the thermal interface material 504 away from the circuit 500. For example, the heatsink 506 may dissipate the heat into the air around the heatsink 506. That air may be circulated (e.g., by a fan) to carry the heat way from the heatsink 506.

Figure 6:
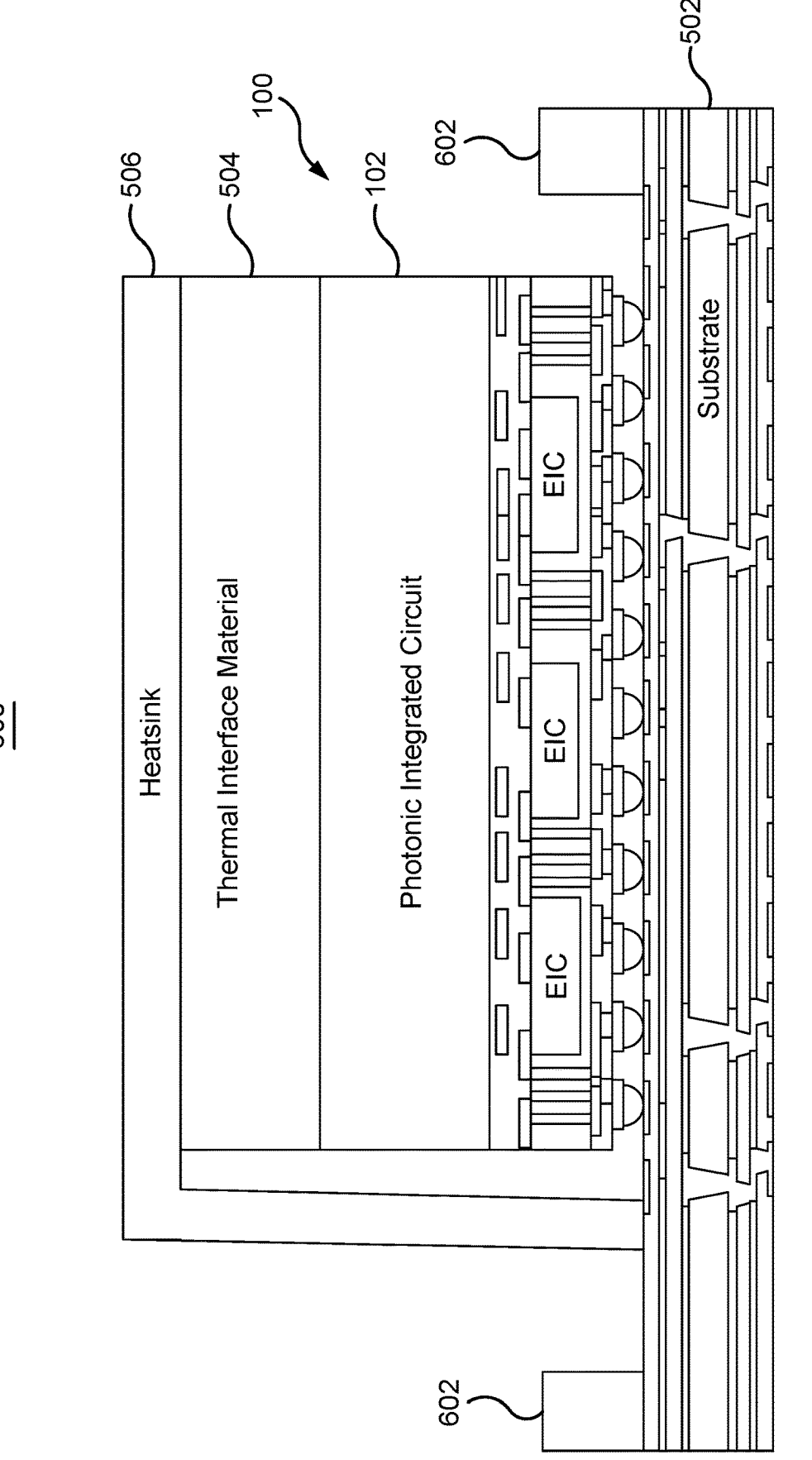
FIG. 6 illustrates an example circuit.

FIG. 6 illustrates an example circuit 600. Like the circuit 500, the circuit 600 includes the circuit 100 mounted on the substrate 502. The thermal interface material 504 is positioned on the photonic integrated circuit 102. The heatsink 506 is coupled to the substrate 502, and a portion of the heatsink 506 contacts the thermal interface material 504. Heat generated by the photonic integrated circuit 102 is carried by the thermal interface material 504 to the heatsink 506, which dissipates that heat to the surrounding environment.

The circuit 600 also includes a ring 602 attached to the substrate 502. The ring 602 may also be referred to as a stiffener ring 602. The ring 602 may be positioned on the substrate 502 and may encircle the circuit 100 and the heatsink 506. The ring 602 may provide additional structural support for the substrate 502. For example, the ring 602 may stiffen the structure of the substrate 502, which makes the substrate 502 less likely to deform or warp. As a result, the ring 602 may improve the performance and reliability of the circuit 600.

Figure 7:
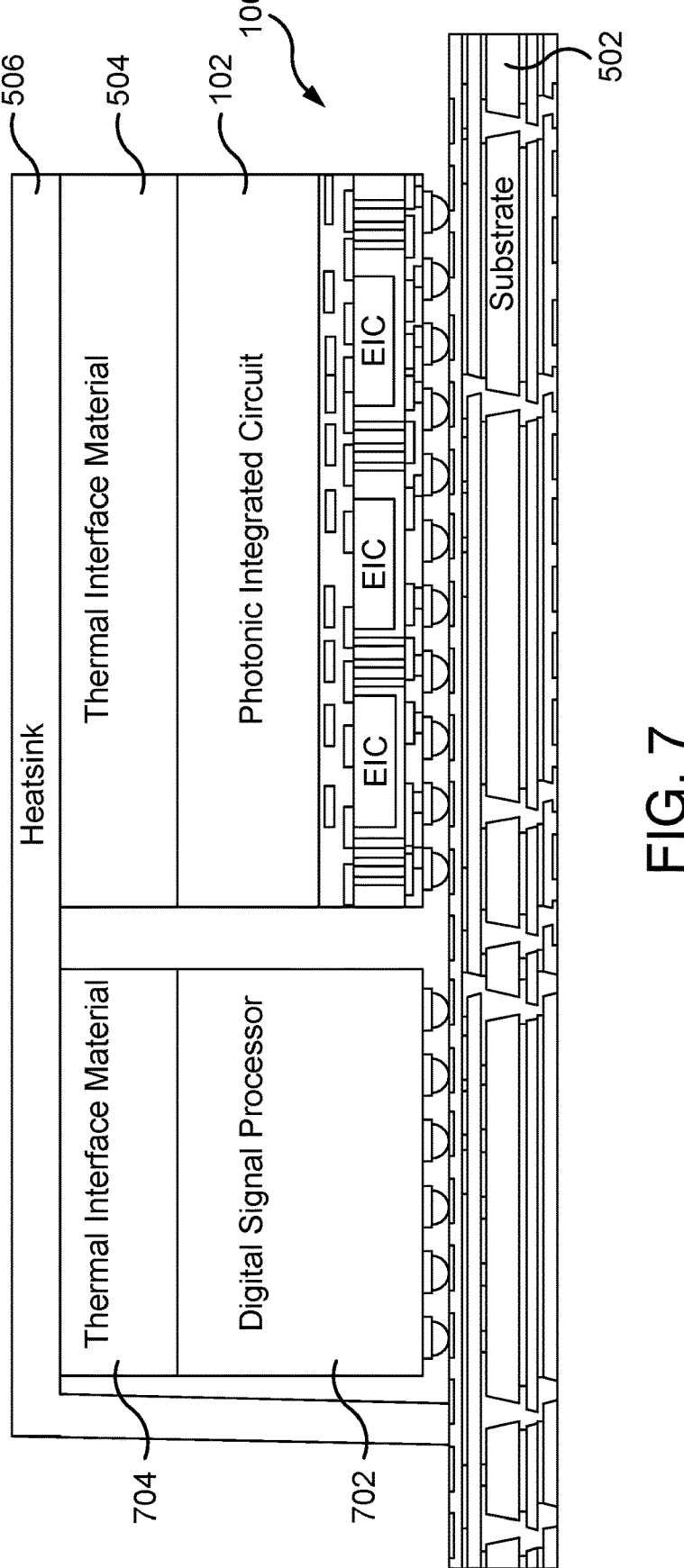
FIG. 7 illustrates an example circuit.

FIG. 7 illustrates an example circuit 700. Like the circuit 500, the circuit 700 includes the circuit 100 mounted on the substrate 502. The thermal interface material 504 is positioned on the photonic integrated circuit 102. The heatsink 506 is coupled to the substrate 502, and a portion of the heatsink 506 contacts the thermal interface material 504. Heat generated by the photonic integrated circuit 102 is carried by the thermal interface material 504 to the heatsink 506, which dissipates that heat to the surrounding environment.

The circuit 700 also includes a digital signal processor 702 mounted on the substrate 502. The digital signal processor 702 may receive and process electrical signals from the circuit 100, and the digital signal processor 702 may produce and communicate electrical signals to the circuit 100. The substrate 502 may carry electrical signals between the digital signal processor 702 and the circuit 100. Additionally, the digital signal processor 702 may be positioned beneath the heatsink 506. A thermal interface material 504 may be positioned on the digital signal processor 702. The heatsink 506 may contact the thermal interface material 704. The thermal interface material 704 may carry heat produced by the digital signal processor 702 to the heatsink 506. The heatsink 506 may then dissipate that heat to the surrounding environment.

In certain embodiments, the circuit 700 provides better dissipation relative to embodiments in which the digital signal processor 702 is embodied within an electronic integrated circuit 110 in the circuit 100. Heat produced by the digital signal processor 702 may be dissipated directly through the thermal interface material 704 and heatsink 506, rather than through other components in the circuit 100. As a result, the circuit 700 may provide for better heat management.

Figure 8:
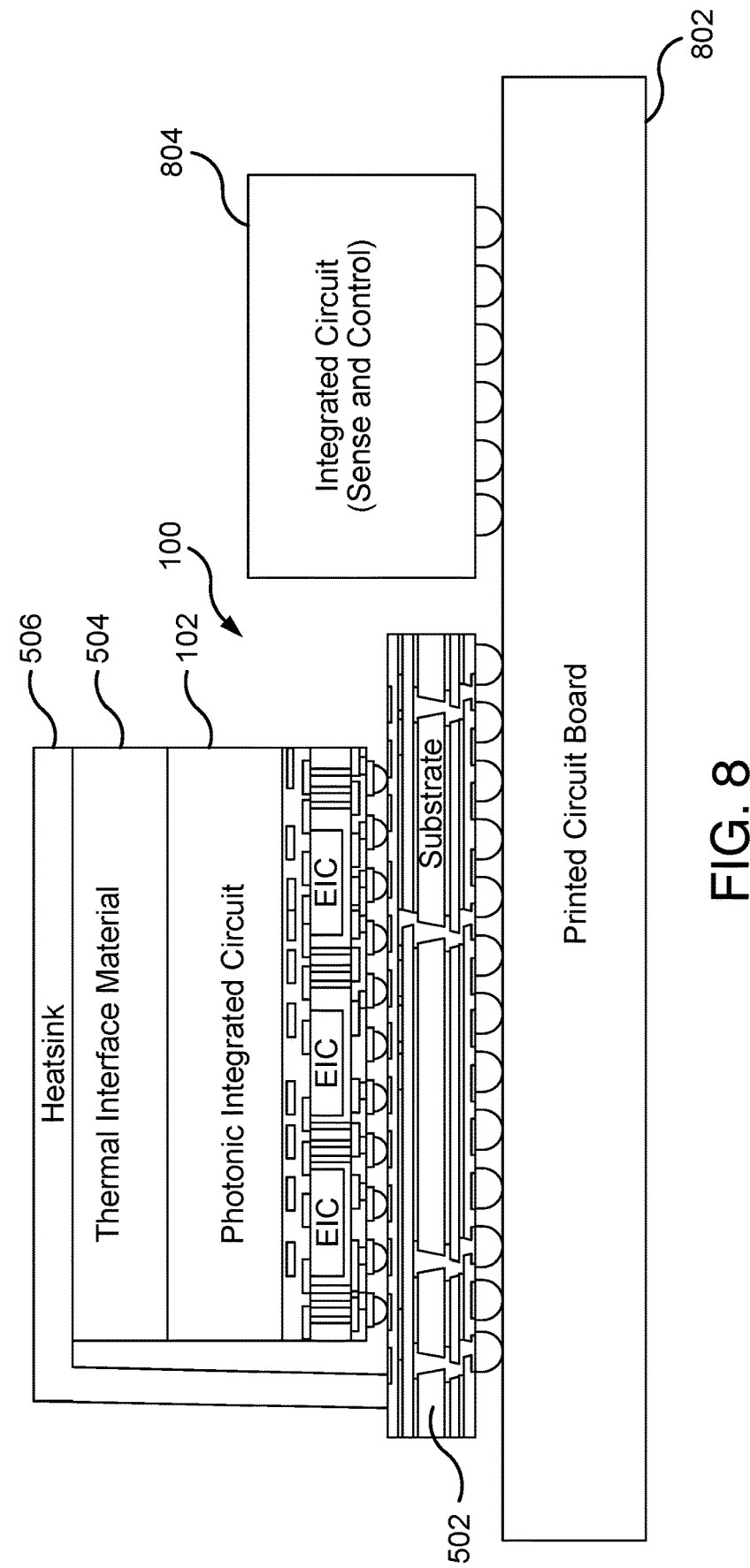
FIG. 8 illustrates an example circuit.

FIG. 8 illustrates an example circuit 800. Like the circuit 500, the circuit 800 includes the circuit 100 mounted on the substrate 502. The thermal interface material 504 is positioned on the photonic integrated circuit 102. The heatsink 506 is coupled to the substrate 502, and a portion of the heatsink 506 contacts the thermal interface material 504. Heat generated by the photonic integrated circuit 102 is carried by the thermal interface material 504 to the heatsink 506, which dissipates that heat to the surrounding environment.

As seen in FIG. 8, the substrate 502 is mounted onto a printed circuit board 802. For example, the substrate 502 may be soldered onto the printed circuit board 802. Additionally, an integrated circuit 804 is mounted onto the printed circuit board 802. The printed circuit board 802 may carry electrical signals between the substrate 502 and the integrated circuit 804. The integrated circuit 804 may provide any functionality. For example, the integrated circuit 804 may sense various aspects related to the operation of the circuit 100 (e.g., temperature, voltages, power). As another example, the integrated circuit 804 may control the operation of the circuit 100.

In some embodiments, separating the integrated circuit 804 from the circuit 100 may reduce the size of the circuit 100 relative to embodiments where the integrated circuit 804 is embodied in an electronic integrated circuit 110 in the circuit 100. Additionally, mounting the integrated circuit 804 on the printed circuit board 802 separate from the circuit 100 and the substrate 502 may reduce thermal constraints on the circuit 100.

Figure 9A:
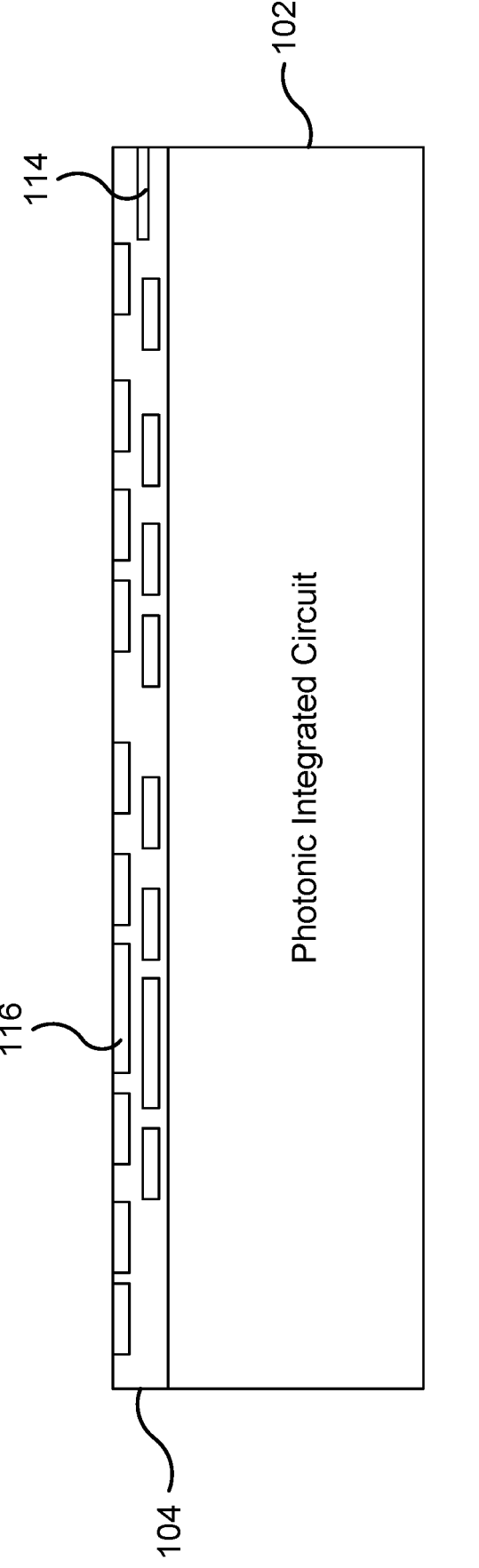
FIG. 9A through 9C illustrate an example process for forming a circuit.
Figure 9B:
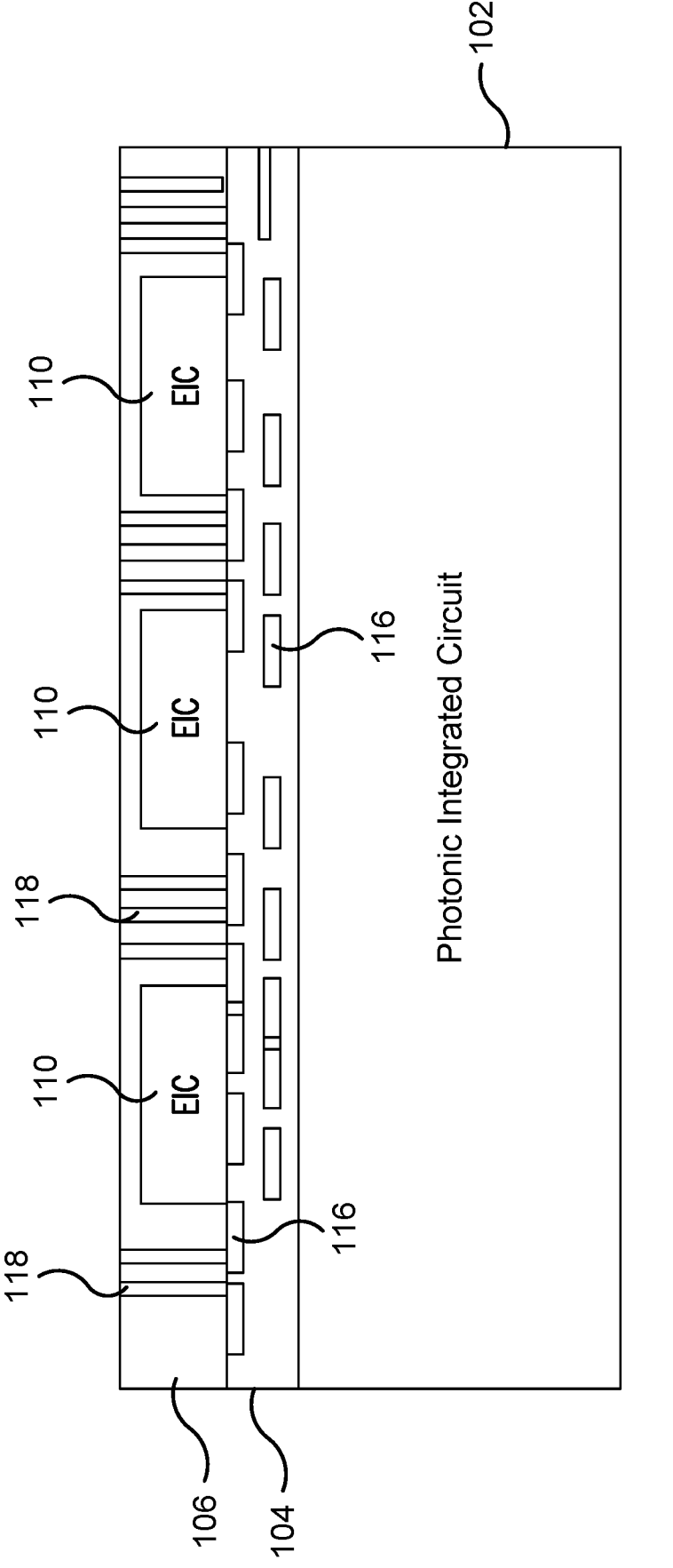
Figure 9C:
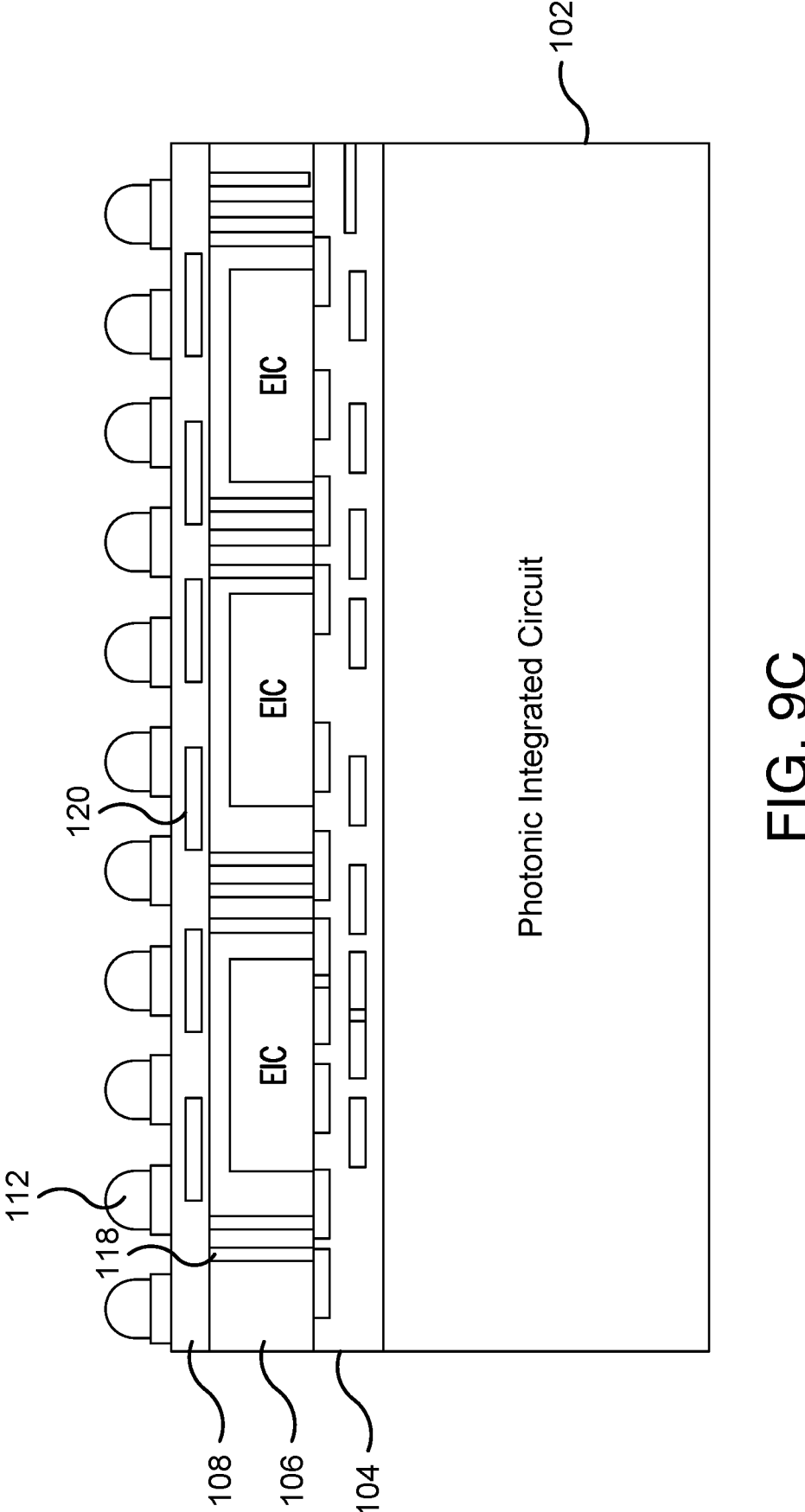

FIG. 9A through 9C illustrate an example process for forming a circuit. Generally, the process may be used to form the circuit 100. As seen in FIG. 9A, the process begins with the photonic integrated circuit 102, which may include the intermetal dielectric 104. In some embodiments, the intermetal dielectric 104 may be part of (e.g., a layer of) the photonic integrated circuit 102. In other embodiments, the intermetal dielectric 104 may be a separate component that is attached to the photonic integrated circuit 102. The intermetal dielectric 104 includes the metal layers 116 that electrically connect to the photonic integrated circuit 102. Additionally, the intermetal dielectric 104 includes the optical component 114 that directs optical signals into the photonic integrated circuit 102.

As seen in FIG. 9B, in the next step of the process, the electronic integrated circuits 110 are attached to the intermetal dielectric 104. Specifically, the electronic integrated circuits 110 may be positioned on the intermetal dielectric 104 so that the electronic integrated circuits 110 form electrical connections with the photonic integrated circuit 102 through the metal layers 116 in the intermetal dielectric 104. Oxide may then be deposited or filled around the electronic integrated circuits 110 to form the oxide layer 106 on the intermetal dielectric 104. After the oxide layer 106 is formed, through oxide vias 118 may be formed through the oxide layer 106. The through oxide vias 118 may electrically connect to the metal layers 116 in the intermetal dielectric 104. These metal layers 116 may electrically connect to the electronic integrated circuits 110. Additionally, some of the through oxide vias 118 may be formed in the oxide layer 106 between electronic integrated circuits 110.

As seen in FIG. 9C, in the next step of the process, the redistribution layer 108 is attached to the oxide layer 106. The redistribution layer 108 may be aligned with the oxide layer 106 so that metal layers 120 in the redistribution layer 108 electrically connect to the through oxide vias 118 in the oxide layer 106. After the redistribution layer 108 is formed, pads and solder balls 112 may be formed on the redistribution layer 108. The pads and solder balls 112 may electrically connect to the metal layers 120 in the redistribution layer 108. As a result, the pads, solder balls 112, metal layers 120, through oxide vias 118, and metal layers 116 carry electrical signals between the electronic integrated circuits 110 and other components outside the circuit. In certain embodiments, single sided redistribution layer 108 processing is used. The thickness of the oxide layer 106 and deposition parameters for the oxide could be optimized or set for warpage control.

Figure 10:
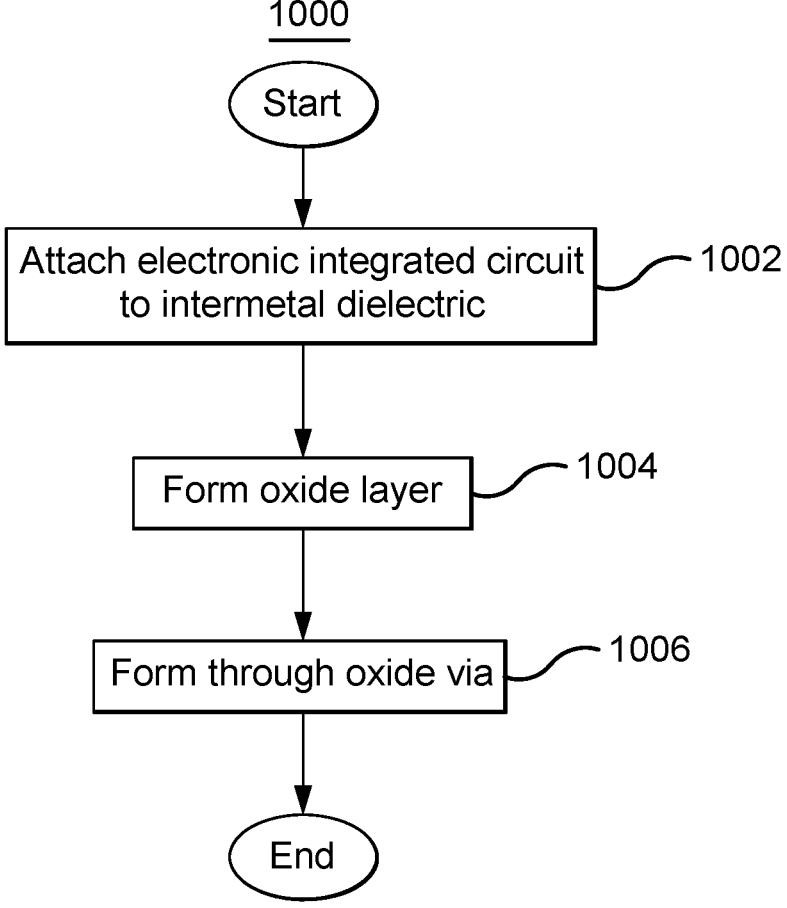
FIG. 10 is a flowchart of an example method for forming a circuit.

FIG. 10 is a flowchart of an example method 1000 for forming a circuit 100. In particular embodiments, a machine or circuit manufacturer may perform the method 1000. By performing the method 1000, the circuit 100 may have improved thermal dissipation relative to existing circuits that position or embed electronic integrated circuits in a molding compound or in a fanout wafer or package. Additionally, the circuit 100 may be less susceptible to warpage, which improves performance and reliability.

In block 1002, the machine attaches an electronic integrated circuit 110 to an intermetal dielectric 104 of a photonic integrated circuit 102. The machine may repeat block 1002 any number of times to attach any number of electronic integrated circuits 110 to the intermetal dielectric 104. The intermetal dielectric 104 may include metal layers 116 that electrically connect the photonic integrated circuit 102 and the electronic integrated circuit 110. The intermetal dielectric 104 may also include an optical component 114 that carries optical signals to the photonic integrated circuit 102. The photonic integrated circuit 102 may convert the optical signals into electrical signals. The photonic integrated circuit 102 may then communicate the electrical signals through the metal layers 116 to the electronic integrated circuit 110.

In block 1004, the machine forms an oxide layer 106. The machine may deposit or fill oxide around the electronic integrated circuit 110 to form the oxide layer 106. As a result, the electronic integrated circuit 110 may be positioned in or embedded in the oxide layer 106. The oxide layer 106 may also be formed on the intermetal dielectric 104 so that the intermetal dielectric 104 is positioned between the photonic integrated circuit 102 and the oxide layer 106. In some embodiments, the oxide layer 106 may provide improved thermal conduction relative to existing circuits that position or embed electronic integrated circuits 110 in molding compound or in a fanout wafer or package.

In block 1006, the machine forms a through oxide via 118 in the oxide layer 106. The through oxide via 118 may extend through the oxide layer 106 to the intermetal dielectric 104. In some embodiments, the through oxide via 118 is formed in the oxide layer 106 between electronic integrated circuits 110 positioned in the oxide layer 106. The through oxide via 118 may electrically connect to a metal layer 116 in the intermetal dielectric 104. The metal layer 116 may electrically connect to the electronic integrated circuit 110. As a result, the through oxide via 118 may carry electrical signals to and from the electronic integrated circuit 110.

The machine may also form a redistribution layer 108 on the oxide layer 106. The redistribution layer 108 may include metal layers 120 that connect to the through oxide via 118. The machine may also form pads or solder balls 112 on the redistribution layer 108. The pads or solder balls 112 may electrically connect to the metal layers 120. As a result, the solder balls 112, pads, metal layers 120, through oxide via 118, and metal layers 116 may carry electrical signals to and from the electronic integrated circuit 110.

In summary, the circuit 100 includes a photonic integrated circuit 102 and an electronic integrated circuit 110. An intermetal dielectric 104 is attached to the photonic integrated circuit 102 and the electronic integrated circuit 110. The intermetal dielectric 104 is positioned between the photonic integrated circuit 102 and the electronic integrated circuit 110, and the intermetal dielectric 104 includes metal layers 116 that electrically connect the photonic integrated circuit 102 to the electronic integrated circuit 110. Additionally, the electronic integrated circuit 110 is positioned in (e.g., embedded in) an oxide layer 106 attached to the intermetal dielectric 104. Through oxide vias 118 are formed through the oxide layer 106. The through oxide vias 118 connect to some of the metal layers 116 in the intermetal dielectric 104, and these metal layers 116 electrically connect to the electronic integrated circuit 110.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A circuit comprising:
   a photonic integrated circuit;
   an intermetal dielectric coupled to the photonic integrated circuit;
   an oxide layer coupled to the intermetal dielectric such that the intermetal dielectric is positioned between the photonic integrated circuit and the oxide layer; and
   a first electronic integrated circuit positioned within the oxide layer and directly coupled to the intermetal dielectric, wherein a through oxide via extends through the oxide layer to the intermetal dielectric.

2. The circuit of claim 1, wherein the through oxide via electrically connects to a metal layer in the intermetal dielectric, and wherein the metal layer electrically connects to the first electronic integrated circuit.

3. The circuit of claim 1, further comprising an optical component positioned within the intermetal dielectric, wherein the optical component is arranged to direct an optical signal to the photonic integrated circuit.

4. The circuit of claim 3, wherein the optical component is an optical mode converter positioned at an edge of the intermetal dielectric and arranged to edge couple the optical signal into the intermetal dielectric.

5. The circuit of claim 3, wherein the photonic integrated circuit defines a cavity, and wherein the optical component is a grating coupler arranged to couple the optical signal into the intermetal dielectric as the optical signal travels through the cavity.

6. The circuit of claim 1, further comprising a second electronic integrated circuit positioned within the oxide layer and coupled to the intermetal dielectric, wherein the through oxide via is positioned between the first electronic integrated circuit and the second electronic integrated circuit.

7. The circuit of claim 1, further comprising an interposer die positioned within the oxide layer, wherein the through oxide via is positioned within the interposer die.

8. The circuit of claim 1, further comprising a redistribution layer coupled to the oxide layer such that the oxide layer is positioned between the intermetal dielectric and the redistribution layer.

9. The circuit of claim 8, further comprising an interposer coupled to the redistribution layer such that the redistribution layer is positioned between the oxide layer and the interposer.

10. A method of forming a circuit, the method comprising:

attaching a first electronic integrated circuit directly to an intermetal dielectric;

forming an oxide layer on the intermetal dielectric such that the first electronic integrated circuit is positioned in the oxide layer and such that the intermetal dielectric is positioned between a photonic integrated circuit and the oxide layer; and forming a through oxide via through the oxide layer to the intermetal dielectric.

11. The method of claim 10, wherein the through oxide via electrically connects to a metal layer in the intermetal dielectric, and wherein the metal layer electrically connects to the first electronic integrated circuit.

12. The method of claim 10, where an optical component is positioned within the intermetal dielectric, and wherein the optical component is arranged to direct an optical signal to the photonic integrated circuit.

13. The method of claim 12, wherein the optical component is an optical mode converter positioned at an edge of the intermetal dielectric and arranged to edge couple the optical signal into the intermetal dielectric.

14. The method of claim 12, wherein the photonic integrated circuit defines a cavity, and wherein the optical component is a grating coupler arranged to couple the optical signal into the intermetal dielectric as the optical signal travels through the cavity.

15. The method of claim 10, further comprising attaching a second electronic integrated circuit to the intermetal dielectric, wherein the second electronic integrated circuit is positioned within the oxide layer, and wherein the through oxide via is positioned between the first electronic integrated circuit and the second electronic integrated circuit.

16. The method of claim 10, wherein the through oxide via is positioned within an interposer die positioned within the oxide layer.

17. The method of claim 10, further comprising attaching a redistribution layer to the oxide layer such that the oxide layer is positioned between the intermetal dielectric and the redistribution layer.

18. The method of claim 17, further comprising attaching an interposer to the redistribution layer such that the redistribution layer is positioned between the oxide layer and the interposer.

19. A system comprising:

a substrate;

a circuit coupled to the substrate, the circuit comprising:

a photonic integrated circuit;

an intermetal dielectric coupled to the photonic integrated circuit;

an oxide layer directly coupled to the intermetal dielectric such that the intermetal dielectric is positioned between the photonic integrated circuit and the oxide layer and such that the oxide layer is positioned between the substrate and the intermetal dielectric; and an electronic integrated circuit positioned within the oxide layer and coupled to the intermetal dielectric, wherein a through oxide via extends through the oxide layer to the intermetal dielectric; and a heatsink coupled to the substrate, wherein the heatsink extends over the circuit such that the circuit is positioned between the substrate and the heatsink.

20. The system of claim 19, further comprising a thermal interface material positioned between the heatsink and the circuit.

* * * * *